(12) United States Patent
Mason

(10) Patent No.: US 10,409,059 B2
(45) Date of Patent: Sep. 10, 2019

(54) PROJECTION DISPLAY

(75) Inventor: Stephen Paul Mason, Maidstone (GB)

(73) Assignee: BAE SYSTEMS plc, London (GB)

( * ) Notice: Subject to any disclaimer, the term of this patent is extended or adjusted under 35 U.S.C. 154(b) by 366 days.

(21) Appl. No.: 14/112,768

(22) PCT Filed: Apr. 12, 2012

(86) PCT No.: PCT/GB2012/050795
§ 371 (c)(1),
(2), (4) Date: Oct. 18, 2013

(87) PCT Pub. No.: WO2014/143701
PCT Pub. Date: Oct. 26, 2012

(65) Prior Publication Data
US 2014/0043689 A1    Feb. 13, 2014

(30) Foreign Application Priority Data

Apr. 18, 2011   (EP) ..................................... 11275062
Apr. 18, 2011   (GB) ................................... 1106513.3

(51) Int. Cl.
*G02B 27/01*    (2006.01)
*G02B 6/34*     (2006.01)
*G02B 6/42*     (2006.01)

(52) U.S. Cl.
CPC ........... *G02B 27/0101* (2013.01); *G02B 6/34* (2013.01); *G02B 6/4298* (2013.01); *G02B 2027/0125* (2013.01)

(58) Field of Classification Search
CPC ............ G02B 27/0172; G02B 27/0101; G02B 27/2221

(Continued)

(56) References Cited

U.S. PATENT DOCUMENTS 6,580,529 B1    6/2003 Amitai et al.
7,199,934 B2 *  4/2007 Yamasaki .......... G02B 27/0093
                                                345/7

(Continued)

FOREIGN PATENT DOCUMENTS

GB    2 458 865 A       10/2009
WO    WO 99/52002 A1    10/1999

(Continued)

OTHER PUBLICATIONS

Notification Concerning Transmittal of International Preliminary Report on Patentability (Chapter I of the Patent Cooperation)(Form PCT/IB/326 & Form PCT/IB/373) and the Written Opinion of the International Searching Authority (Translation)(Form PCT/ISA/237) dated Oct. 31, 2013, in the corresponding International Application No. PCT/GB2012/050795. (8 pages).

(Continued)

*Primary Examiner* — Kristina M Deherrera
(74) *Attorney, Agent, or Firm* — Finch & Maloney PLLC

(57) ABSTRACT

The present invention provides a projection display, for displaying an image to a viewer. An image-providing light source device is arranged to inject an input pupil of multi-spectral image bearing light into a waveguide assembly. The waveguide assembly comprises first and second diffraction regions arranged respectively for expanding the input pupil in first and second generally orthogonal dimensions and outputting an exit pupil expanded in the first and second dimensions from the waveguide assembly. The diffractive regions of the waveguide assembly are matched to cause zero or substantially zero net chromatic aberration. A combiner is arranged to direct the exit pupil towards the viewer for viewing an image and to transmit light from a real world scene through the combiner so that the image overlays the light from the real world scene.

19 Claims, 3 Drawing Sheets

(58) Field of Classification Search
USPC .............................. 359/629–638, 478, 479
See application file for complete search history.

(56) References Cited

U.S. PATENT DOCUMENTS

| | | |
|---|---|---|
| 9,310,566 B2 | 4/2016 | Valera et al. |
| 2005/0180687 A1* | 8/2005 | Amitai ............................ 385/31 |
| 2007/0029032 A1 | 2/2007 | McCarthy et al. |
| 2008/0285137 A1 | 11/2008 | Simmonds et al. |
| 2009/0190222 A1* | 7/2009 | Simmonds ........... G02B 6/0028 |
| | | 359/567 |
| 2009/0279180 A1 | 11/2009 | Amitai et al. |
| 2010/0271698 A1 | 10/2010 | Kessler |
| 2012/0033195 A1* | 2/2012 | Tai ............................... 356/4.01 |
| 2012/0033306 A1 | 2/2012 | Valera et al. |
| 2012/0224062 A1* | 9/2012 | Lacoste ................ G01C 21/365 |
| | | 348/148 |

FOREIGN PATENT DOCUMENTS

| | | |
|---|---|---|
| WO | WO 2005/124427 A1 | 12/2005 |
| WO | WO 2007/029032 A1 | 3/2007 |
| WO | WO 2007/029034 A1 | 3/2007 |
| WO | WO 2010/119240 A1 | 10/2010 |
| WO | 2013144565 | 10/2013 |

OTHER PUBLICATIONS

International Search report (PCT/ISA/210) dated Aug. 16, 2012, by the Great Britain Patent Office as the International Searching Authority for International Application No. PCT/GB2012/050795.
European Search Report dated Jan. 20, 2012.
Great Britain Search Report dated Aug. 15, 2011.

* cited by examiner

PROJECTION DISPLAY

This invention relates to a projection display for displaying an image to a viewer which is particularly, but not exclusively, suitable for use in a head up display.

Traditionally head up displays, which may be used in an aircraft or other vehicle, use a conventional spherical lens system to generate a collimated display from an image provider such as a cathode ray tube. The light rays emanating from the spherical lens system are reflected by a conventional fold mirror through a spherical exit lens system and from there passed to a combiner from which the image is reflected to provide a collimated display to the viewer such as a pilot of an aircraft or operator of a vehicle. Thus with these conventional displays the collimating optics used, that is the spherical lens system and spherical exit lens system, are large and bulky, which may limit the use of such a head up display in a cockpit area with insufficient space to accommodate such a head up display.

More recently, the use of one or more waveguides have been employed to project an image to a user. The present applicant has disclosed such waveguide displays in earlier patent applications WO2007/029032, WO2007/029034 and WO2010/119240 the content of which is incorporated herein by reference. In these earlier waveguide displays a relatively small input pupil is generated using a micro display and coupled into at least one waveguide. The input pupil is stretched in two generally orthogonal directions by respective diffraction regions and output from a waveguide as a larger exit pupil for viewing by a user. One advantage of waveguide displays is that they occupy less space and are therefore more suitable for use in space limited environments.

WO2007/029032 discloses the use of two so-called plate-like waveguides. The input pupil is coupled into a first waveguide and propagates by total internal reflection along the waveguide reflecting between each of two opposed and parallel sides of the generally rectilinear waveguide. A grating is arranged to stretch the input pupil in one dimension in the direction of propagation and output it from the first waveguide. The light is coupled into a second waveguide and propagates by total internal reflection along the second waveguide reflecting between each of two opposed and parallel sides of the generally rectilinear second waveguide. A further grating is arranged to stretch the pupil in a second dimension, generally orthogonal to the first direction and in the direction of propagation. Accordingly when the grating outputs the exit pupil from the second waveguide it is larger in both first and second dimensions and can be viewed easily by a user.

WO2007/029034 discloses the use of a first rod-like waveguide and a second plate-like waveguide. The input pupil is coupled into a first waveguide and propagates by total internal reflection along the waveguide reflecting in sequence from each of the four perpendicular sides of the generally rectilinear waveguide. This somewhat spiral propagation of the light distinguishes a rod-like waveguide from a plate-like waveguide and is useful for reducing the size of the waveguide display. A diffraction region is arranged to stretch the input pupil in one dimension and output it from the first waveguide. Similarly to WO2007/029032, the light is coupled into a second plate-like waveguide and propagates by total internal reflection along the second waveguide reflecting between each of two opposed and parallel sides of the generally rectilinear second waveguide. A further diffraction region is arranged to stretch the pupil in a second dimension, generally orthogonal to the first direction and in the direction of propagation. Accordingly when the diffraction region outputs the exit pupil from the second waveguide it is larger in both first and second dimensions and can be viewed easily by a user.

WO2010/119240 discloses the use of a single plate-like waveguide which expands the input pupil in both first and second dimensions. An advantage of this arrangement is that it does not require two waveguides to be accurately fixed in relative orientation and the gratings can be formed in more accurate alignment. In a similar way to the two waveguides displays above, an input pupil is coupled into the waveguide and stretched in one dimension by a first grating region and in the second dimension by a second grating region which outputs the expanded exit pupil from the waveguide for viewing by a user.

A waveguide display according to any one of the three described displays is shown schematically in FIG. 1. The display comprises a waveguide assembly 50 having at least one waveguide which both presents the desired display to the user 56 whilst also allowing the outside world to be viewed through the waveguide. The user is located in this Figure in a cockpit of an aircraft having a transparent canopy 51. It is a distinct advantage of waveguide displays that one of the waveguides acts as a combiner in addition to expanding the pupil because this results in a more compact device with fewer parts. The user may continue to observe the light 52 from the outside world scene which is transmitted through combiner and also view the light of the exit pupil 54 which is output the waveguide assembly towards the user to overlay the outside world scene.

Also shown is an image processor 58 which generates an image signal 59 and outputs it to a micro-display 60. In order to produce a colour, or multi-spectral image, the micro-display may comprise a multi-spectral light source that illuminates a display, which may for example be transmissive or reflective, and outputs collimated image bearing light 61 comprising a plurality of wavelengths for coupling into the waveguide assembly 50.

Whilst the above described waveguide displays provide a compact display solution in limited space environments, especially in aircrafts cockpits where there is a desire to decrease the required space for a display, the trend in aircraft design is to incorporate large panoramic canopies as shown in FIG. 2. However, a waveguide assembly using a multi-spectral light source such as an LED has a range of output angles towards the user which are arranged around 90° to the plane of the combiner waveguide. The perpendicular orientation is a necessary constraint of the design to avoid colour aberration. In this case, there is insufficient space to provide a display of adequate size as emphasised in FIG. 2 with the use of broken lines. It will also be appreciated that in some environments such as in a cockpit, a pilot may require a heads-down display 62 in a convenient position for viewing, which additionally reduces the available space for a head-up display.

The present invention aims to provide an improved display.

The present invention provides a projection display, for displaying an image to a viewer, including an image-providing light source device arranged to generate an input pupil of image bearing light, a waveguide assembly arranged to receive the input pupil of image bearing light and including first and second diffraction regions arranged respectively to expand the input pupil in first and second generally orthogonal dimensions and to output an exit pupil of image bearing light expanded in the first and second dimensions from the waveguide assembly, and a combiner arranged to direct the image bearing light from the exit pupil towards a viewer for viewing the image bearing light and to allow light from a real world scene through the combiner so that the image bearing light overlays the light from the real world scene.

The image-providing light source device may be arranged to inject an input pupil of multi-spectral image bearing light into the waveguide assembly. The diffractive regions of the waveguide assembly may be matched to cause zero or substantially zero net chromatic aberration.

The first or the second diffraction region may serve as an output diffraction region located in a waveguide of the waveguide assembly and the output diffraction region may be arranged to output the exit pupil of image bearing light from the waveguide assembly at an angle which is perpendicular to a plane of the waveguide.

The combiner may have a generally planar surface which is orientated at an angle relative to the plane of the waveguide to direct the exit pupil of image bearing light towards the viewer.

The exit pupil of image bearing light may include a plurality of wavelengths and the planar surface of the combiner may be configured generally to reflect the multi-spectral image bearing light of the exit pupil and generally to transmit light from the real world scene through the combiner.

The combiner may include a reflective coating selected to be reflective for the image bearing light of the exit pupil and transmissive to light from an outside world scene.

The combiner may include an anti-reflection coating arranged to increase the transmission efficiency of light from an outside world scene through the combiner.

The waveguide assembly may include a plate-like waveguide along which the image-bearing light can propagate by total internal reflection between opposing and parallel sides of the waveguide and includes said first and said second diffraction regions, said first region arranged to diffract the image-bearing light so as to expand it in the first dimension and said second diffraction region arranged to further diffract the image-bearing light so as to expand it in the second dimension and to release it from the waveguide as the exit pupil.

Alternatively, the waveguide assembly may include a first plate-like waveguide along which the image-bearing light can propagate by total internal reflection between opposing and parallel sides of the first plate-like waveguide and includes said first diffraction region arranged to diffract the image-bearing light so as to expand it in the first dimension and a second plate-like waveguide along which the image-bearing can propagate by total internal reflection between opposing and parallel sides of the second plate-like waveguide and includes said second diffraction region arranged to further diffract the image-bearing light so as to expand it in the second dimension and to release it from the second plate-like waveguide as the exit pupil.

In another arrangement, the waveguide assembly may include a rod-like waveguide along which the image-bearing light can propagate by total internal reflection from each of the four sides of the rod-like waveguide in turn and includes said first diffraction region arranged to diffract the image-bearing light so as to expand it in the first dimension and a plate-like waveguide along which the image-bearing can propagate by total internal reflection between opposing and parallel sides of the plate-like waveguide and includes said second diffraction region arranged to further diffract the image-bearing light so as to expand it in the second dimension and to release it from the plate-like waveguide as the exit pupil.

An aircraft or vehicle including a transparent canopy or windshield and a projection display as described above, wherein the combiner may be located to allow an occupant to view a real world scene outside the transparent canopy or windshield through the combiner with image bearing light generated by the projection display overlaying the real world scene. The combiner may be incorporated in the canopy or windshield if it is sufficiently reflective and optically flat.

The projection display may form part of a Head Up Display, particularly for use on an aircraft or vehicle.

The invention will now be described by way of example only, with reference to the accompanying drawings, in which.

Figure 1:
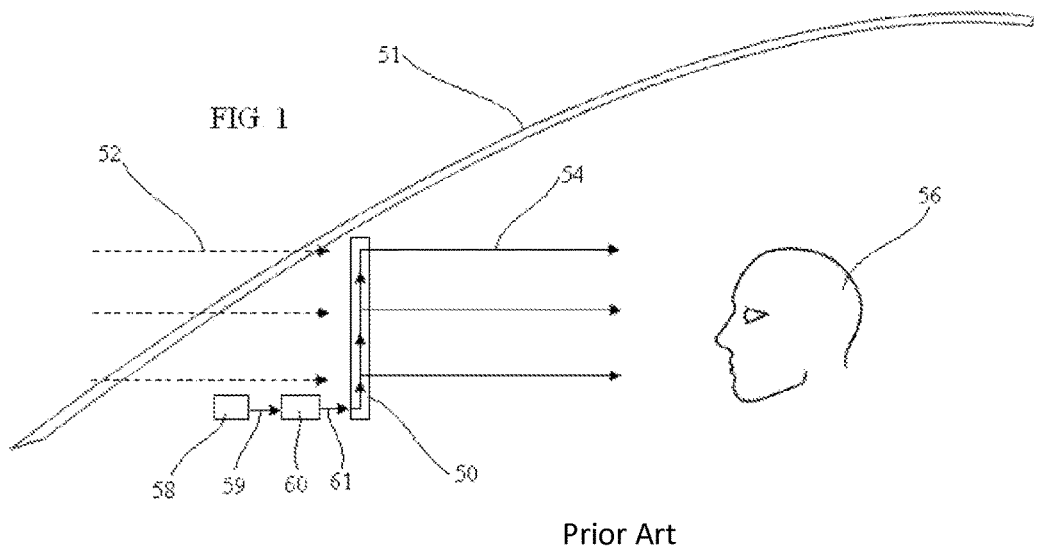
FIG. 1 is a schematic illustration of a prior art waveguide display in the form of a head up display.
Figure 2:
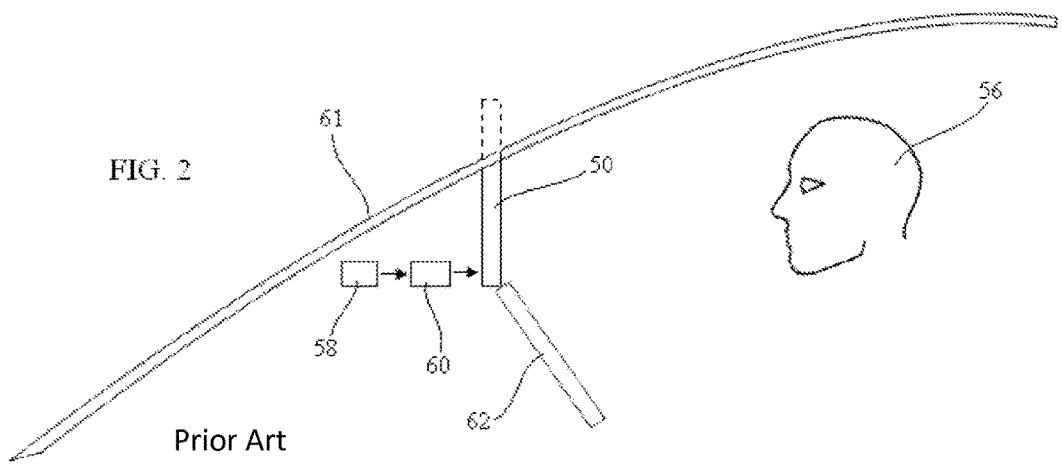
FIG. 2 is a similar schematic illustration as shown in FIG. 1 showing the problem with known displays in a space restricted environment.
Figure 3:
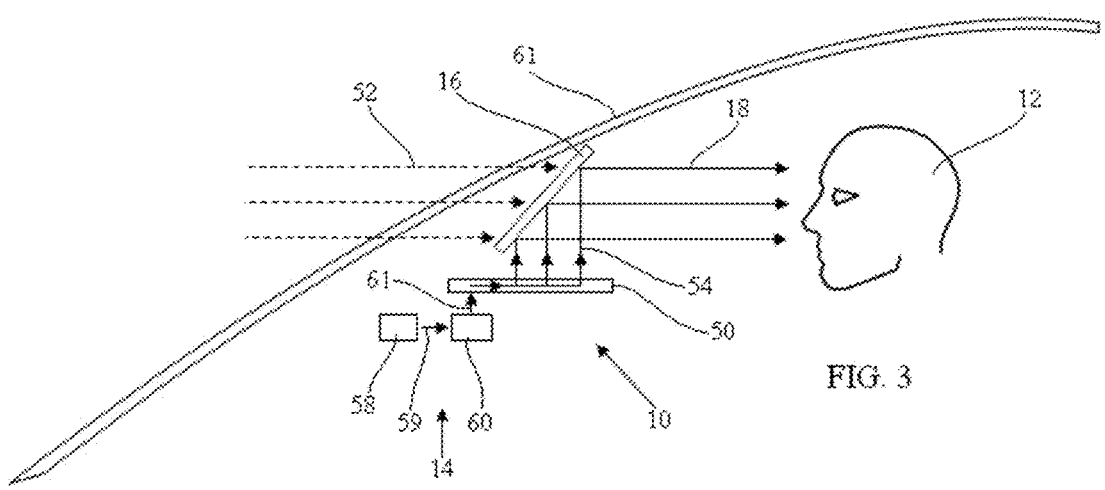
FIG. 3 is a schematic illustration of a projection display according to an embodiment of the present invention.

Referring to FIG. 3, a projection display 10 is shown for displaying an image to a viewer 12. The projection display 10 comprises a waveguide assembly 50 as discussed above and as disclosed in detail in our earlier patent applications WO2007/029032, WO2007/029034 and WO2010/119240, together with an image-providing light source arrangement 14 comprising image processor 58 and display device 60 also as discussed above. The arrangement 14 injects an input pupil 61 of multi-spectral image bearing light into the waveguide assembly 50. The waveguide assembly 50 comprises a plurality of diffraction gratings discussed in more detail below arranged for coupling light into the waveguide assembly 50, expanding the input pupil 61 in first and second generally orthogonal dimensions and outputting an exit pupil 54 expanded in the first and second dimensions from the waveguide assembly 50. A combiner 16 is arranged to direct the exit pupil 54 towards the viewer 12 for viewing an image 18 and to transmit light 52 from a real world scene through the combiner 16 so that the image 18 overlays the light 52 from the real world scene.

The use of a combiner 16 with a waveguide assembly 50 is counter-intuitive since the waveguide assembly 50 already has a built-in combiner in the form of an output waveguide. However, as discussed herein the additional combiner 16 of the invention provides advantages for projection of multi-spectral light not realised in known projector apparatus. It will additionally be appreciated that the general physical size of the waveguide assembly 50 of the projection display 10 is smaller than previous lens incorporating displays and therefore depending on space requirement it may be desirable to use a combiner 16 with such a waveguide assembly 50 for displaying mono-chromatic images.

The first or the second diffraction grating serves as an output grating located in a waveguide of the waveguide assembly 50 and the output grating is arranged to output the exit pupil from the waveguide assembly 50 at an angle which is generally perpendicular to a plane of the waveguide assembly 50.

Figure 4:
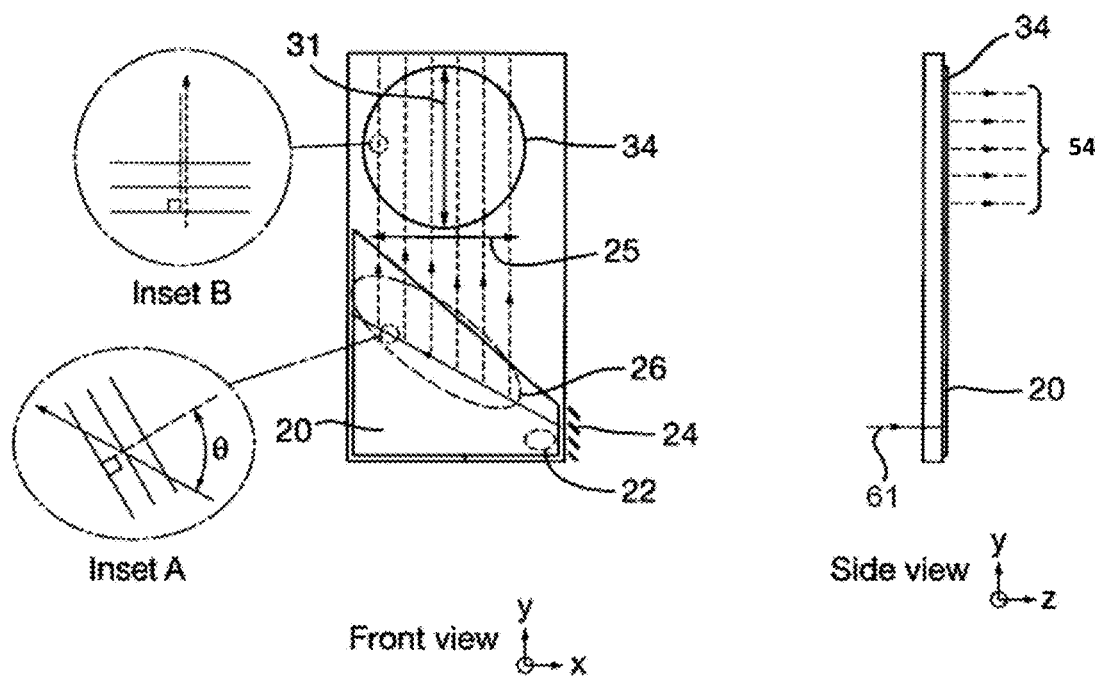
FIG. 4 shows three views of one arrangement of a waveguide assembly for the display shown in FIG. 3.
Figure 4:
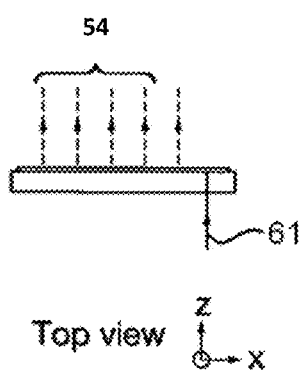

FIG. 4 shows a waveguide assembly 50 having a single waveguide 40 as described in WO2010/119240 and having diffraction regions 26, 34 arranged respectively for expanding the input pupil of image bearing light in first and second dimensions 25, 31. This example also includes a first, input, diffraction region 22 for coupling the input pupil of image bearing light into the waveguide assembly 50 for propagation by total internal reflection. The first input diffraction region 22 and the second diffraction region 26 are formed by the same grating 20. The third diffraction region 34 is formed by another grating. Referring to FIGS. 3 and 4, in use, an input pupil 61 is coupled into the waveguide assembly 50 and directed towards reflective surface 24 where it is reflected towards the second diffraction region 26. The second diffraction region 26 expands the input pupil 61 in a first dimension 25 and turns it towards the third diffraction region 34. The third diffraction region 34 expands the input pupil 61 in a second dimension 31, generally orthogonal to the first dimension 25, and outputs expanded image bearing light from the waveguide assembly 50 as exit pupil 54.

In more detail, the orientation of the grooves of the grating 20 are inclined at an angle of 60° to the x-axis so that image bearing light incident on the first input diffraction grating 22 is diffracted and propagated to the reflective surface 24 and from there is reflected so that the chief ray of the image bearing light propagates and is incident on the grooves of the second diffraction region at 30° to the normal to the grooves, inset A). The image bearing light is partially diffracted and expanded in a first dimension, herein the x-dimension, and turned to propagate through the waveguide assembly 50 to a low efficiency (2% to 20%) third diffraction grating 34 having the orientation of its grooves lying in the x-direction. The diffracted rays of image bearing light are incident normally on this grating 34 (inset B) and are partially diffracted out of the waveguide assembly 50, the partial diffraction serves to expand the input pupil 61 in a second dimension, here the y-dimension.

Generally, a diffractive grating or surface can exhibit large amounts of dispersion of incident image bearing light. This can result in light rays having the same or similar field angles, but which differ in wavelength, being diffracted into different angles into, within or from a waveguide assembly 50, causing potentially large amounts of chromatic aberration at an output of a projection display 10. However, if the dispersion associated with an input grating to a waveguide is substantially matched in an opposing sense with the dispersion associated with an output grating from the waveguide, then the net chromatic dispersion will approach or substantially equal zero. The correct matching of the diffractive gratings of the waveguide assembly 50 has the effect of mitigating chromatic aberration. In the FIG. 4 waveguide assembly 50 the net chromatic aberration caused by the three diffraction regions 22, 26, 34 must be zero or substantially zero. For example, the grating 20 forming the first and second diffractive regions 22, 26 must be matched with the grating of the third diffractive region 34 to provide a net chromatic dispersion of substantially zero. This result is advantageous for a projection display 10 used in head mounted or helmet mounted applications that incorporate such a waveguide assembly 50 as it allows the use of a small, cheap and broadband image generating light source in place of a relatively costly, bulky and high powered monochromatic light source, for example a laser, to illuminate the waveguide assembly 50. Such a result also allows the projection display 10 to correctly present multiple colour or full colour display image 18 or information to a viewer 12.

For a waveguide assembly 50 described herein, a first diffraction grating may have a grating region which can be used to couple the incident image bearing light into the waveguide assembly 50 with a second grating having two grating regions which can be used to stretch the input pupil and output it from the waveguide assembly 50. Alternatively, a first diffraction grating may have two grating regions which can be used to couple the incident image bearing light into the waveguide assembly 50 and stretch the input pupil in a first dimension with a second diffraction grating having a grating region used to stretch the input pupil in the second dimension and output it from the waveguide assembly 50. It can be shown that the output angle $\theta_o$ is related to the input angle $\theta_i$ by the equation:

$$\sin(\theta_o) = \lambda(1/d_i - 1/d_o) + \sin(\theta_i)$$

Where $d_i$ and $d_o$ are the periods of the input and output gratings respectively. Accordingly, if the fringe periods of the gratings are the same, lambda cancels and $\theta_o$ equals $\theta_i$. Thus the grating periods must be matched to avoid chromatic aberration for light sources other than monochromatic sources such as a laser. It will be appreciated that if it is required to match the gratings in this way to avoid chromatic aberration, light must be output from the waveguide assembly 50 generally perpendicularly and this being the case, it is not possible to match the gratings and also output the light at an angle other than generally 90 degrees. Therefore, it will be seen that even though the waveguide assembly 50 comprises a built-in combiner, the built-in combiner cannot be angled relative to the viewer 12. That is, if the prior art projection apparatus is to be located in a space limited environment, the built-in combiner cannot be orientated selectively to occupy the space most efficiently. However, in the present invention, the additional combiner 16 can be orientated to occupy space efficiently and therefore the invention provides a noticeable advantage.

Figure 5:
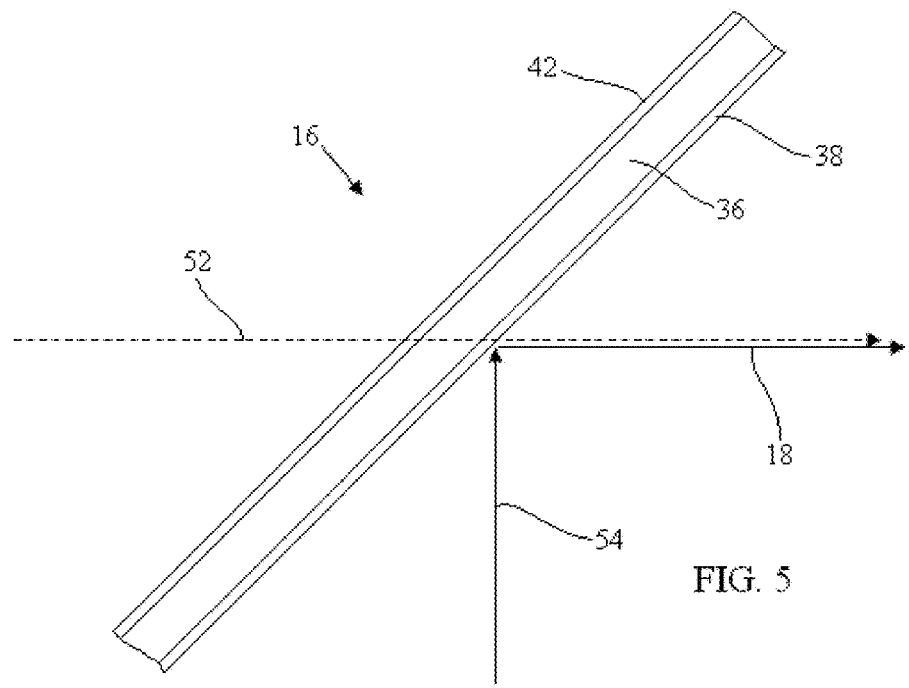
FIG. 5 shows a section of a combiner for the display shown in FIG. 3.

FIG. 5 shows a section taken through the combiner 16. The combiner comprises an optically transparent planar substrate 36 typically made from glass. An optically reflective coating 38 is provided on one surface of the substrate. The coating may be a multi-layer dielectric coating having thicknesses and dielectric properties selected to be reflective to wavelengths present in the multi-spectral light of the exit pupil 54 output from the waveguide assembly 50 but transmissive to wavelengths in light 52 from an outside world scene. An anti-reflective layer 42 is provided on an opposing surface of the substrate 36 configured to increase the transmission efficiency of light 52 through the combiner 16. The anti-reflective layer 42 may for example have a thickness of a quarter wavelength designed to produce interference to allow greater transmission.

The wavelength selective coating 38 on the combiner 16 improves efficiency by increasing the reflectance of the wavelengths used by the display device 60 whilst also allowing transmission of the outside world scene. A neutral density coating could also be used but would not be as efficient. In some arrangements, the windshield or canopy 61 can be used as the combiner if it provides adequate reflection and is optically flat.

Referring again to FIG. 3, the combiner 16 is orientated at an angle relative to the plane of the waveguide assembly 50 to direct the exit pupil 54 towards the viewer 12. In the example shown the combiner 16 is orientated at about 45° to the plane of the waveguide assembly 50, although it will be appreciated that other angles may be appropriate depending on the relative orientations of the waveguide assembly 50, the combiner 16 and the viewer 12. For instance, the waveguide assembly 50 may be angled away from the viewer 12 and in which case the combiner 16 may be orientated at less than 45° to the plane of the waveguide assembly 50. It will be appreciated that the orientation of the combiner 16 can match more closely the angle of the windscreen 61 than is possible with the use of a waveguide assembly 50 as shown in the earlier patent applications that do not incorporate such an additional combiner 16. That is, from the perspective of the viewer 12, the part of the windshield through which the light 52 travels is angled away from the viewer 12 at angle of about 30° to the horizontal. The combiner 16 is angled away from the viewer 12 by about 45° to the horizontal. A waveguide assembly 50 without an additional combiner 16 would be angled at 90° to the horizontal. Accordingly, the projection display 10 of the invention may be more compact.

The combiner 16 may be mounted in a fixed orientation to the waveguide assembly 50 in any suitable way for example it may be mounted to waveguide assembly 50 or another part of aircraft or vehicle or if part of an aircraft canopy is fixed, it may mounted to that part of the canopy.

The waveguide assembly 50 in FIG. 4 may be modified in another embodiment of the invention and as disclosed in detail in WO2007/029032. This waveguide assembly 50 comprises a first plate-like waveguide along which the image-bearing light can propagate by total internal reflection between opposing and parallel sides of the waveguide and having said first diffraction region for diffracting the image-bearing light so as to expand it in the first dimension and a second plate-like waveguide along which the image-bearing can propagate by total internal reflection between opposing and parallel sides of the waveguide and having said second diffraction region for further diffracting the image-bearing light so as to expand it in the second dimension and for releasing it from the waveguide as the exit pupil.

The waveguide assembly in FIG. 4 may also be modified in a further embodiment of the invention and as disclosed in detail in WO2007/029032. This waveguide assembly comprises a first rod-like waveguide along which the image-bearing light can propagate by total internal reflection from each of the four sides of the waveguide in turn and having said first diffraction region for diffracting the image-bearing light so as to expand it in the first dimension and a second plate-like waveguide along which the image-bearing can propagate by total internal reflection between opposing and parallel sides of the waveguide and having said second diffraction region for further diffracting the image-bearing light so as to expand it in the second dimension and for releasing it from the waveguide as the exit pupil.

The projection display illustrated according to the invention can form part of a Head Up Display, particularly for aircraft usage.

The invention claimed is:

1. A projection display, for displaying an image to a viewer, including:
    an image-providing light source device arranged to generate an input pupil of multi-spectral image bearing light;
    a waveguide assembly arranged to receive the input pupil of multi-spectral image bearing light, injected from the image bearing light source, and including first, second, and third diffraction regions, the second and third diffraction regions arranged respectively to expand the input pupil of multi-spectral image bearing light in first and second generally orthogonal dimensions and to output an exit pupil of image bearing light expanded in the first and second dimensions from the waveguide assembly, along which the multi-spectral image-bearing light can propagate by total internal reflection, the first and second diffraction regions include a first grating, the third diffraction region includes a second grating that is different than the first grating; and
    a combiner having a surface arranged to receive the exit pupil of image bearing light from the waveguide assembly at a non-perpendicular angle with respect to the surface of the combiner, and to direct the exit pupil of image bearing light, by reflection, towards a viewer for viewing the exit pupil of image bearing light and to allow light from a real world scene through the combiner so that the exit pupil of image bearing light overlays the light from the real world scene,
    wherein a fringe period of the first grating is the same as a fringe period of the second grating and an output angle of the second grating is the same as an input angle of the first grating to cause zero net chromatic aberration of the multi-spectral image bearing light, and
    wherein the waveguide assembly is oriented at an acute angle with respect to the combiner.

2. The projection display as claimed in claim 1, wherein the first or the second diffraction region serves as an output diffraction region located in a waveguide of the waveguide assembly and the output diffraction region is arranged to output the exit pupil of image bearing light from the waveguide assembly at an angle which is perpendicular to a plane of the waveguide.

3. The projection display as claimed in claim 2, wherein the surface of the combiner is a generally planar surface.

4. The projection display as claimed in claim 2, wherein the exit pupil of image bearing light includes a plurality of wavelengths and the planar surface of the combiner is configured generally to reflect the multi-spectral image bearing light of the exit pupil and generally to transmit light from the real world scene through the combiner.

5. The projection display as claimed in claim 4, wherein the combiner includes a reflective coating selected to be reflective for the image bearing light of the exit pupil and transmissive to light from an outside world scene.

6. The projection display as claimed in claim 4, wherein the combiner includes an anti-reflection coating arranged to increase the transmission efficiency of light from an outside world scene through the combiner.

7. The projection display as claimed in claim 1, wherein the waveguide assembly includes a plate-like waveguide along which the image-bearing light can propagate by total internal reflection between opposing and parallel sides of the waveguide and includes said first and said second diffraction regions, said first region arranged to diffract the image-bearing light so as to expand it in the first dimension and said second diffraction region arranged to further diffract the image-bearing light so as to expand it in the second dimension and to release it from the waveguide as the exit pupil.

8. The projection display as claimed in claim 1, wherein the waveguide assembly includes a first plate-like waveguide along which the image-bearing light can propagate by total internal reflection between opposing and parallel sides of the first plate-like waveguide and includes said first diffraction region arranged to diffract the image-bearing light so as to expand it in the first dimension and a second plate-like waveguide along which the image-bearing light can propagate by total internal reflection between opposing and parallel sides of the second plate-like waveguide and includes said second diffraction region arranged to further diffract the image-bearing light so as to expand it in the second dimension and to release it from the second plate-like waveguide as the exit pupil.

9. The projection display as claimed in claim 1, wherein the waveguide assembly includes a rod-like waveguide along which the image-bearing light can propagate by total internal reflection from each of the four sides of the rod-like waveguide in turn and includes said first diffraction region arranged to diffract the image-bearing light so as to expand it in the first dimension and a plate-like waveguide along which the image-bearing light can propagate by total internal reflection between opposing and parallel sides of the plate-like waveguide and includes said second diffraction region arranged to further diffract the image-bearing light so as to expand it in the second dimension and to release it from the plate-like waveguide as the exit pupil.

10. An aircraft or vehicle including a transparent canopy or windshield and a projection display as claimed in claim 1, wherein the combiner is located to allow an occupant to view a real world scene outside the transparent canopy or windshield through the combiner with image bearing light generated by the projection display overlaying the real world scene.

11. A projection display, for displaying an image to a viewer, including:
   an image-providing light source device arranged to generate an input pupil of multi-spectral image bearing light;
   a waveguide assembly arranged to receive the input pupil of multi-spectral image bearing light, injected from the image bearing light source, and including first, second, and third diffraction regions, the second and third diffraction regions arranged respectively to expand the input pupil of multi-spectral image bearing light in first and second generally orthogonal dimensions and to output an exit pupil of image bearing light expanded in the first and second dimensions from the waveguide assembly, along which the multi-spectral image-bearing light can propagate by total internal reflection, the first and second diffraction regions include a first grating, the third diffraction region includes a second grating that is different than the first gating; and
   a combiner having a surface arranged to receive the exit pupil of image bearing light from the waveguide assembly at a non-perpendicular angle with respect to the surface of the combiner, and to direct the exit pupil of image bearing light, by reflection, towards a viewer for viewing the exit pupil of image bearing light and to allow light from a real world scene through the combiner so that the exit pupil of image bearing light overlays the light from the real world scene,
   wherein a fringe period of the first grating is substantially the same as a fringe period of the second grating and an output angle of the second grating is substantially the same as an input angle of the first grating, thereby minimizing chromatic aberration of the multi-spectral image bearing light, and
   wherein the waveguide assembly is oriented at an acute angle with respect to the combiner.

12. The projection display as claimed in claim 11, wherein the first or the second diffraction region serves as an output diffraction region located in a waveguide of the waveguide assembly and the output diffraction region is arranged to output the exit pupil of image bearing light from the waveguide assembly at an angle which is perpendicular to a plane of the waveguide.

13. The projection display as claimed in claim 12, wherein the surface of the combiner is a generally planar surface.

14. The projection display as claimed in claim 12, wherein the exit pupil of image bearing light includes a plurality of wavelengths and the planar surface of the combiner is configured generally to reflect the multi-spectral image bearing light of the exit pupil and generally to transmit light from the real world scene through the combiner.

15. The projection display as claimed in claim 14, wherein the combiner includes a reflective coating selected to be reflective for the image bearing light of the exit pupil and transmissive to light from an outside world scene.

16. The projection display as claimed in claim 14, wherein the combiner includes an anti-reflection coating arranged to increase the transmission efficiency of light from an outside world scene through the combiner.

17. The projection display as claimed in claim 11, wherein the waveguide assembly includes a plate-like waveguide along which the image-bearing light can propagate by total internal reflection between opposing and parallel sides of the waveguide and includes said first and said second diffraction regions, said first region arranged to diffract the image-bearing light so as to expand it in the first dimension and said second diffraction region arranged to further diffract the image-bearing light so as to expand it in the second dimension and to release it from the waveguide as the exit pupil.

18. The projection display as claimed in claim 11, wherein the waveguide assembly includes a first plate-like waveguide along which the image-bearing light can propagate by total internal reflection between opposing and parallel sides of the first plate-like waveguide and includes said first diffraction region arranged to diffract the image-bearing light so as to expand it in the first dimension and a second plate-like waveguide along which the image-bearing light can propagate by total internal reflection between opposing and parallel sides of the second plate-like waveguide and includes said second diffraction region arranged to further diffract the image-bearing light so as to expand it in the second dimension and to release it from the second plate-like waveguide as the exit pupil.

19. The projection display as claimed in claim 11, wherein the waveguide assembly includes a rod-like waveguide along which the image-bearing light can propagate by total internal reflection from each of the four sides of the rod-like waveguide in turn and includes said first diffraction region arranged to diffract the image-bearing light so as to expand it in the first dimension and a plate-like waveguide along which the image-bearing light can propagate by total internal reflection between opposing and parallel sides of the plate-like waveguide and includes said second diffraction region arranged to further diffract the image-bearing light so as to expand it in the second dimension and to release it from the plate-like waveguide as the exit pupil.

* * * * *